Oct. 16, 1951 L. W. MUELLER ET AL 2,571,925
VALVE
Filed April 13, 1945

Inventors
Lucien W. Mueller
Walter J. Bowan
Wallace E. Gould
By Cushman, Darby & Cushman
Attorneys Patented Oct. 16, 1951

2,571,925

UNITED STATES PATENT OFFICE 2,571,925

VALVE

Lucien W. Mueller, Walter J. Bowan, and Wallace E. Gould, Decatur, Ill., assignors to Mueller Co., Decatur, Ill., a corporation of Illinois Application April 13, 1945, Serial No. 588,095

1 Claim. (Cl. 251—101)

The present invention relates to valves.

An important object of the invention is to provide a valve including a resilient coating on the seating surface.

Another object of the invention is to provide a valve including a plug which is normally urged toward its seat by resilient means secured thereto.

A further object of the invention is to provide a valve including a plug which can be held seated without the necessity of a lubricant seal or lubricant pressure.

Still another object of the invention is to provide a valve including a plug which can be readily unseated and which will immediately reseat itself.

Another object of the invention is to provide a meter stop which can be readily unseated after it has been in one position for a long period of time.

Other objects and advantages of the invention will be apparent from the following drawings, wherein—

Figure 1:
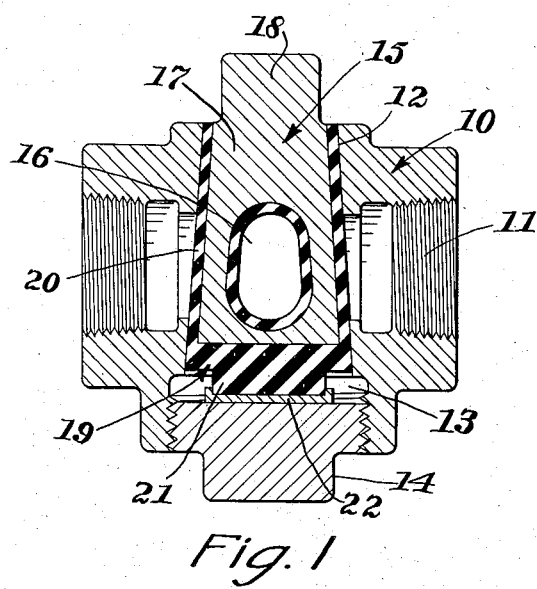
Figure 2:
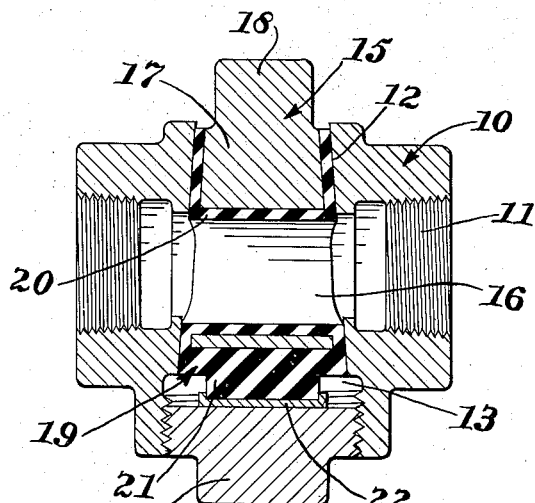

Figure 1 is an axial section through the valve, with the plug in closed position, and Figure 2 is a view similar to Figure 1 but showing the plug in open position and momentarily unseated.

The valve of the present invention includes a casing 10 provided with a flow passageway 11. A tapered seat 12 extends through the casing transversely of the flow passageway, the smaller end of the tapered seat opening to the exterior of the casing. A chamber 13 is provided in the casing at the larger end of the seat 12 and includes threads to receive a cap 14. A tapered plug 15 including a flow port 16 is mounted in the seat 12, the smaller end 17 of the plug extending out of the casing and being provided with an operating shank 15.

The larger end of the plug 15 extends into the chamber 13 and has a body 19 of a resilient material, such as rubber or neoprene, secured thereto. A coating 20 of the same material preferably extends about the seating surface of the plug and through the flow port 16. Whatever resilient body or coating is applied to the plug will be molded and vulcanized. In the embodiment shown in the drawings, wherein the resilient material completely surrounds the seating surface and port, the resilient material is molded and vulcanized to make it integral with the metal core of the plug.

The provision of a resilient coating 20 extending about the seating surface enables the plug to be fully sealed by that material alone, thereby avoiding the necessity of lubricating the plug to afford a seal.

In any event, the body or block 19 of resilient material at the larger end of the plug extends outwardly from that end of the plug to a sufficient distance to contact with the inner surface of the cap 14. This contact is preferably obtained by forming an extension 21 on the body 19, the extension being of less diameter than the larger end of the plug and having a metal face plate or washer 22 secured thereto. The face plate 22 will contact with the inner end of the cap 14.

During normal use, the plug 15 will be held firmly seated by having the cap 14 threaded inwardly sufficiently far to exert seating force through the resilient body 19. The body 19 will be slightly compressed by this action and, if the seating surface is covered with resilient material, such resilient material will also be slightly compressed to firmly contact with the seating surface 12 of the casing 10.

The present valve is particularly designed for use as a gas meter stop. Valves of this type are operated at very infrequent intervals, usually only when there is a change of occupancy requiring closing or opening of the gas supply to the meter. Therefore, the plug may become so tightly seized to the seat of the casing that it is difficult or impossible to rotate. Present-day plugs of this type must ordinarily be struck with a hammer to free them from the seat, and if the plug is held rigidly seated, the valve may be damaged by such a blow.

When it is desired to rotate the plug of the present invention, the operating shank 18 may be struck with a hammer and, because of the provision of the resilient body 19 at its larger end, the plug can readily be unseated by such a blow. Figure 2 shows the plug in the inward position which it would occupy when it is struck. However, this position would only be a momentary one because the resiliency of body 19 and extension 21 would immediately restore the plug to the normal position shown in Figure 1. If the seating surface of the plug is coated with a resilient material as shown in the embodiment of the invention disclosed in the drawings, no leakage of fluid from the smaller end of the seat can occur during the momentary unseating action. That is, because the resilient material on the seating surface is normally under compression when seated, this material will simply expand to remain in contact with the casing seating surface when the plug is moved inwardly by a hammer blow.

The drawing shows the bodily resilient element 19 including the extension 21 as of solid formation and substantial depth. However, the thickness of this body and the matter of whether it is solid may vary, depending upon the resiliency of the material of which it is formed. The portion of the casing with which the resilient plug-seating body contacts may vary, but the use of a threaded cap at the large end of the plug as the opposed casing surface enables the degree of seating compression to be conveniently adjusted. If desired, the resilient body may be secured to the threaded cap 14.

The terminology used in the specification is for the purpose of description and not of limitation, the scope of the invention being defined in the claim.

We claim:

In a valve, a casing including a flow passageway and a tapered seat extending transversely of the passageway, a ported and tapered plug rotatable in the casing seat, the casing being provided with a chamber opening to the larger end of its seat, a cap adjustably threaded in the chamber, the plug being provided with a body of resilient material at its larger end contacting with the inner surface of the cap to thereby normally hold the plug in seated position, the resilient material of said body extending over the seating surface of the plug.

LUCIEN W. MUELLER.
WALTER J. BOWAN.
WALLACE E. GOULD.

REFERENCES CITED

The following references are of record in the file of this patent:

UNITED STATES PATENTS

| Number | Name | Date |
|---|---|---|
| 1,854,651 | Goodall | Apr. 19, 1932 |
| 1,922,840 | Browne | Aug. 15, 1933 |
| 2,070,000 | Clade | Feb. 9, 1937 |
| 2,285,222 | Mueller | June 2, 1942 |
| 2,296,649 | Mueller | Sept. 2, 1942 |